March 2, 1965  A. H. RICE  3,171,804
SEWAGE AND INDUSTRIAL WASTE PURIFICATION PROCESS
Filed Oct. 16, 1961

INVENTOR.
ARCHIE H. RICE
BY
BUCKHORN, CHEATHAM & BLORE
ATTORNEYS

United States Patent Office 3,171,804
Patented Mar. 2, 1965

3,171,804
SEWAGE AND INDUSTRIAL WASTE
PURIFICATION PROCESS
Archie H. Rice, 1600 Western Ave., Corvallis, Oreg.
Filed Oct. 16, 1961, Ser. No. 145,211
7 Claims. (Cl. 210—53)

The present invention relates to a process for the purification of sewage and industrial wastes in preparation for their reuse, discharge to receiving surface waters, or ground water recharge.

Within the present state of the art of sewage and industrial waste purification, there is no economically practical purification process, which will produce an effluent essentially free from turbidity, low in color, and low in phosphorus and nitrogen content. There are many processes which reduce the settleable solids and decrease the oxygen consuming properties of sewage and industrial waste. All of these processes have only a minor and incidental effect on the turbidity, color and dissolved solids content of the sewage or industrial waste.

Lack of an economically practical process for the removal of turbidity, color, phosphorus, nitrogen, and other dissolved solids from sewage and industrial wastes has required industries to locate disadvantageously, caused expensive revisions in manufacturing processes, resulted in the degradation of natural waterways, made impractical in many cases the use of sewage and industrial waste for ground water recharge, and caused some municipalities to transport the effluents expensively long distances from their sewage treatment plants.

It is, therefore, an object of the present invention to provide an economical method for removing from sewage and industrial waste not only suspended and settleable solids, but also essentially all particulate matter, which causes turbidity.

Another object is to provide a process enabling clarification of sewage and industrial wastes at faster flow rates than heretofore possible, thus reducing required plant size.

Still another object is to provide a process for clarifying sewage or industrial wastes to a high degree without requiring flocculation or sedimentation facilities.

It is a further object of the present invention to provide a process, which will remove at least 99 percent of the phosphorus content of the sewage or industrial waste.

It is a still further object of the present invention to provide a process which will remove a substantial amount of the organic nitrogen content of sewage or industrial waste.

It is a still further object of the present invention to provide a process which will remove essentially all color from sewage and industrial waste.

It is a still further object of the present invention to provide a process which will reduce the BOD of sewage and industrial waste by up to 95 percent.

Still another object is to provide an improved method of determining the amounts of treating materials to add in treatment of sewage and industrial wastes.

Other objects and advantages will become apparent from the following description of the invention.

My invention resides in the discovery that particulate matter and other impurities may be removed effectively from sewage and industrial wastes by adding to such wastes a coagulant and a polyelectrolyte or conditioning agent and passing such treated wastes through filter media constructed of granular material sized and arranged so that the flow is always from an area of larger to smaller grain size. My novel method of determining the amounts of such materials to be added will be described in detail hereinafter.

The invention will be further described in detail and illustrated in the accompanying drawings wherein.

Figure 1:
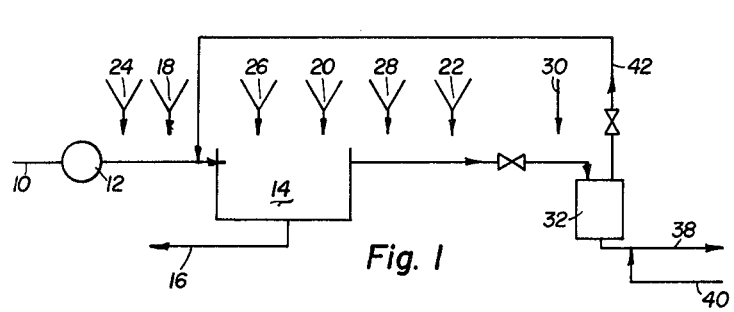
FIG. 1 is a flow diagram illustrating the application of my process to treatment of sewage or industrial waste in a treatment plant.

For the purpose of this application the following terms are defined as follows:

(1) *Sewage.*—The waste products normally transported by a pirvate or communal sewer system.

(2) *Industrial waste.*—The liquid transported waste products resulting from an industrial operation or process, which products are normally conveyed in an industrial sewer to a point of treatment or disposal.

(3) *Coagulant.*—A material capable upon addition to sewage or industrial waste of producing a floc.

(4) *Polyelectrolyte or conditioning agent.* — Generic terms used to describe both naturally occurring biocolloids and synthetic compounds containing recurring units of small molecular weight chemically combined to form a molecule of large size. Because these compounds have the characteristics of both polymers and electrolytes, they are called polymeric electrolytes or polyelectrolytes. Based on the electrical charge which they carry, they are classified as anionic, cationic or nonionic.

(5) *Biochemical oxygen demand (BOD).*—The quantity of oxygen utilized in the biochemical oxidation of organiz matter in 5 days at 20 degrees centrigrade.

Many attempts have been made to coagulate, settle, and filter sewage and industrial wastes which are characterized by their high BOD (in excess of 50 p.p.m.) and total solids (in excess of 100 p.p.m.). They have failed to be economically practical because of the high cost of the large amounts of coagulant required, the short filter runs obtained, and the high cost of the capital facilities necessary for the relatively low rate filters used. I have discovered that with the addition of a coagulant and polyelectrolyte to the waste and passage through a separation bed constructed of granular material with the grain size so arranged that the sewage or industrial waste in passing through the separation bed always flows from an area of larger to an area of smaller grain size, much more effective clarification is obtained and large quantities of sewage and industrial waste solids can be stored within the interstices between the separation bed granules, thus permitting a long period of operation before cleaning of the bed is necessary and which may be accomplished by backflushing. A "separation bed" within the meaning of term as used herein may comprise a single dual media bed or a pair of beds of differently sized media with flow from the bed of larger particles to the bed of smaller particles.

Treatment in accordance with my process is as follows:

(1) If necessary, adjust the pH of the sewage or industrial waste to bring it within the optimum range for producing a floc with the coagulant to be used.

(2) Add to the sewage or industrial waste only sufficient coagulant to produce a floc which is removable in a separation bed. This will be a considerably lower coagulant dosage than that necessary to produce a satisfactorily settleable floc.

(3) Mix the coagulant uniformly throughout the sewage or industrial waste.

(4) Depending upon the final effluent requirements and the economics of chemical dosage versus the cost of constructing facilities to provide contact time, allow a contact time between coagulant and sewage or industrial waste of from 1 minute to 3 hours prior to passing through a separation bed.

(5) Pass the marginally coagulated sewage or industrial waste through a separation bed, adding to it if required, within 5 minutes of the time it enters the separation bed, a cationic, anionic, or nonionic polyelectrolyte.

The optimum pH range to obtain coagulation will vary somewhat depending upon the coagulant used and the nature of the waste being treated. Experience is necessary with a particular waste or sewage to determine the preferred range. When treating domestic sewage utilizing aluminum sulphate as the coagulant the optimum pH range is from about 5.8 to 6.2. With ferric chloride as the coagulant a pH range of between about 5.8 to 8.0 is tolerable. To adjust the pH to the desired range, acids such as sulphuric acid or bases such as soda ash, caustic soda or lime may be utilized.

The amount of primary coagulant (normally a bivalent or trivalent metallic acid salt such as aluminum sulphate, copper sulphate, ferric chloride, ferric sulphate, or ferrous sulphate) will depend upon the characteristics of the sewage of industrial waste and the quality of effluent required. Within very general limits, the amount of coagulant will increase as the required effluent quality increases and as the amount of solids to be removed increases. Between about 5 p.p.m. to 300 p.p.m. will be the normal dosage.

Separation beds can be successfully operated at flow rates up to 15 g.p.m. per square foot. However, at flow rates above 2.0 g.p.m. per square foot, the solids held in the separation bed will have a tendency to break loose and pass through the bed unless the ability of the solids to stay in the bed is increased by the addition of a conditioning agent comprising a polyelectrolyte to the sewage or industrial waste not over a few minutes before the sewage or industrial waste enters the separation bed.

The amount of polyelectrolyte required will normally be less than 2.0 parts of polyelectrolyte per million parts by weight of sewage or industrial waste. The actual amount of polyelectrolyte required is primarily a function of the sewage or industrial waste temperature, viscosity, and the rate of flow through the separation bed. It is slightly affected by the concentration of solids to be removed. It is measurably affected by the time between the addition of the coagulant and the addition of the polyelectrolyte and by the time between the addition of the polyelectrolyte and that time when the sewage or industrial waste enters the separation bed.

The required polyelectrolyte dosage will vary inversely as function of the sewage or industrial waste temperature, directly as a function of the viscosity, inversely as a function of the flow rate through the separation bed, and inversely as the time between the addition of the coagulant and the addition of the polyelectrolyte. The polyelectrolytes appear to strengthen the structural strength of the floc and its power to adhere to the particles of the bed. If the polyelectrolyte is added too long a time prior to filtering, its power of adhesion is diminished. It is theorized that this is because the "sticky" surfaces of the polyelectrolyte become coated with the hydrate of the primary coagulant interfering with the adhesive quality of the polyelectrolyte. I have found that best results are obtained if the polyelectrolyte is added not over five minutes prior to the time of filtering. I have also found that it may be added in a single step or in the case of separated beds of sized media stepwise addition of some polyelectrolyte before the first bed and additional amounts between the beds may be desirable.

The type of polyelectrolyte to be used, i.e., whether anionic, cationic, or nonionic will depend upon the character of the solids to be removed. It has been discovered that by the proper selection of the primary coagulant and polyelectrolyte, not only can colloidal and larger size solids be held in the separation bed, but also many solids in true solution can be removed from the sewage or industrial waste, and held in the separation bed.

An effective polymer is one sold under the trademark Separan NP 10, by the Dow Chemical Company. This material is reported to have a molecular weight of approximately one million and is represented by the formula:

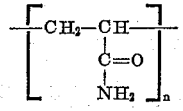

Separan NP 10 is formed by the polymerization of acrylamide. Because of the preponderance of amide groups, the polyacrylamide is essentially nonionic in solution although a small amount of the amide groups are usually hydrolized to anionic carboxyl groupings. It is a white, free flowing, amorphous solid with a bulk density of 0.55 gram per cubic centimeter. It softens at 220–230° C., and decomposition is evident at 270° C. It is rapidly wetted by water and is soluble in water in all proportions.

Other suitable polyelectrolytes include Nalco 110, manufactured by the Nalco Company and Separan AP 30, a product of Dow Chemical Company. Cellulose Gum, a product of Hercules Powder Company and activated silica have been tried and have produced satisfactory results. Naturally occurring biocolloids such as seaweed derivatives, guar gum, and ammonium lignosulfonates derived from wood are also effective.

To determine the amount of polyelectrolyte required, an excess of polyelectrolyte (more than 2.0 p.p.m.) is added to the waste to be treated. The dosage of primary coagulant is adjusted to a minimum such that any further decrease in primary coagulant makes it impossible to obtain a clear effluent from the separation bed at a flow rate through the separation bed of 2.0 g.p.m. per square foot. Holding the flow rate steady the amount of polyelectrolyte is decreased until a turbidity break-through occurs in the separation bed. The polyelectrolyte is then increased until a clear effluent is obtained and filtration continued.

The rate of flow necessary to backflush the separation bed is from 10 g.p.m. per square foot to 20 g.p.m. per square foot. The backflushing liquid can be either the purified or unpurified sewage or industrial waste being treated. The actual backflushing rate will depend upon the size and density of the granules in the separation bed and the specific gravity and viscosity of the backflushing liquid. To assure that the separation bed does not hydraulically regrade during backflushing, it is necessary that the bed be constructed either as two or more separate units containing different sizes of granules or that materials of different densities be used when more than one general size of granule is used in a single bed. When a dual media bed is used, the granules of largest size must have the lowest density and the particles of smallest size must have the highest density.

The practical maximum effective size for granules in a single separation bed is 10 millimeters. The practical minimum effective size is 0.35 millimeter. In the preparation of the bed, it is extremely important that as many fine granules as possible be removed from all but the finest layer. Fine material left in the coarser layers of granules will accumulate at the layer surface and effectively destroy the ability of that layer to pass the sewage or industrial waste without excessive head loss.

*Example*

Extended tests have been conducted on the treatment of the effluent from the Corvallis, Oregon, primary sewage treatment plant. In this plant, sewage from a population of approximately 20,000 people is pumped to an aerated grit chamber following which it is chlorinated and then allowed to settle in a circular settling basin. The sludge which settles in the settling basin is pumped to an anaerobic digester. The settling basin effluent is discharged to the Willamette River. The raw sewage normally has a biochemical oxygen demand of from 150 parts per million to 250 parts per million. The settling basin effluent has a BOD of from 80 parts per million to 150 p.p.m.

A separation bed with the necessary chemical feed equipment and control devices was constructed to clarify and purify by my process a portion of the Corvallis Sewage Treatment Plant effluent. The separation bed was constructed of a 6-inch depth of quartz sand having a specific gravity of approximately 2.65 supported on graded gravel and overlaid with 18 inches of anthracite coal having a specific gravity of approximately 1.55. The sand was sized so that it passed a U.S. 30-mesh sieve and was retained on a U.S. 40-mesh sieve. The coal was sized so that it passed a U.S. 16-mesh sieve and was retained on a U.S. 20-mesh sieve.

The Corvallis Sewage Treatment Plant effluent was pumped to a contact tank which provided a detention period of approximately 10 minutes before the sewage entered the separation bed. Aluminum sulfate was added to the sewage at the rate of 75 p.p.m. as it entered the contact tank. Sulfuric acid was also added to adjust the pH of the contact tank effluent to approximately 6.0 (it having been previously determined that for this particular sewage most effective results were obtained at a pH of between 5.8 and 6.2). As the sewage entered the separation bed, polyacrylamide was added at the rate of 1.5 p.p.m. The flow through the separation bed was maintained at a constant controlled rate of 4.0 gallons per minute per square foot of bed surface area. The separation bed operation followed the typical operating curves shown in FIGURE 5. The minimum turbidity of the separation bed effluent varied from 0.09 standard unit to 0.3 standard unit. The turbidity of the sewage entering the separation bed varied from 50 standard units to 150 standard units. The BOD of the separation bed effluent varied from 6 p.p.m. to 20 p.p.m.

While the BOD of the separation bed effluent and therefore the amount of BOD removal appears to be directly related to the amount of turbidity in the separation bed effluent, the amount of BOD removal is greater than would normally be anticipated from the removal of nondissolved materials in the sewage. There is definite indication that the process removes not only all of the materials not in solution but also part of the materials which are in true solution. This is further evidenced by the fact that the orthophosphate content of the sewage entering the separation bed varied from 10 p.p.m. to 15 p.p.m. while the orthophosphate content of the separation bed effluent varied from 0.1 to 0.4 p.p.m. Again, in the case of the orthophosphate, there appears to be a direct relationship between the separation bed effluent turbidity and its residual orthophosphate content. Nitrate removal in excess of 60 percent was indicated.

Further tests were conducted at separation bed flow rates of 6.0 g.p.m. per square foot and 8.0 g.p.m. per square foot. The only effect of the increase in flow rate was to shorten the time before a turbidity breakthrough occurred.

It is possible to use several flow diagrams incorporating the features outlined above. These will now be described referring to the accompanying drawings.

Referring to FIGURE 1, sewage or industrial waste enters the purification plant at 10, passes through a screen or comminutor 12 and enters a conventional settling basin 14. Sludge from the settling basin is removed to a point of disposal through line 16. Points 18, 20 or 22 are alternate locations for the addition of pH control chemicals. A coagulant, if necessary, is added at one of the alternate points 24, 26 or 28. Wastes low in settleable solids are preferably dosed with pH controls and coagulant at 18 and 24 before the waste enters the basin 14. Wastes with larger amounts of solids preferably are treated at one of the other points. A polyelectrolyte, if necessary, is added at 30 just as the sewage or industrial waste enters the primary separation bed 32. The effluent from the separation bed 32 is discharged through line 38. When the separation bed 32 requires backflushing, this is accomplished by passing purified or unpurified sewage or industrial waste through line 40 up through separation bed 32. The flushing liquid is then returned to the influent of the settling basin 14 through line 42.

Figure 2:
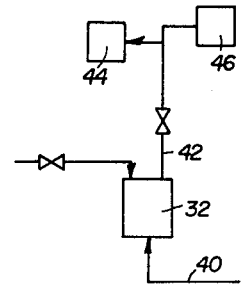
FIG. 2 is a flow diagram of an alternative method of backwashing filters used in my process.

FIGURE 2 shows the alternate disposal of the flushing water from the separation bed 32 to a digester 44 or lagoon 46. Other methods of disposal are also possible.

Figure 3:
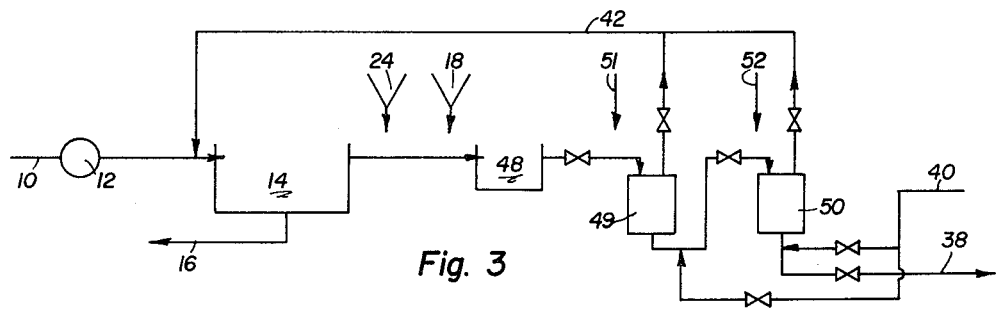
FIG. 3 is a modification of the flow diagram shown in FIG. 1.

The system of FIGURE 3 is similar to FIGURE 1 except that the sole points 18, 24 of addition of pH control chemicals and coagulant dosage is in the influent to a contact tank 48 positioned between the settling basin 14 and the filter which in this instance comprises a pair of beds 49, 50, the former of which contains large particles, the latter smaller particles. Polyelectrolyte may be added stepwise by adding a portion at 51 between the tank 48 and filter 49 with the remainder added at 52 between the beds. The system of FIG. 3 is preferred where the amount of settleable solids in the waste is appreciable, that is, more than 5 p.p.m.

Figure 4:
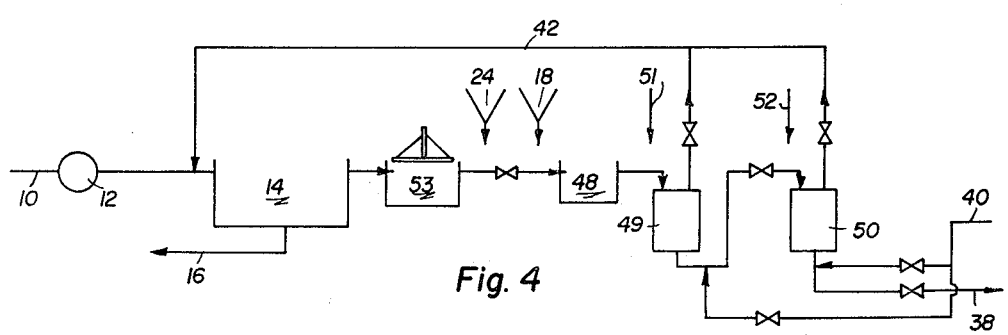
FIG. 4 is a flow diagram of still another method of employing my invention.

FIGURE 4 is identical to FIGURE 3 except that a biological oxidation process 53 has been added to the flow diagram. This biological oxidation process 53 can be one or more trickling filters with or without a final settling basin, an activated sludge unit, an oxidation pond or any other biological oxidation process.

It will be observed that none of these systems include the usual flocculation or sedimentation facilities thus reducing capital requirements and permitting faster through flow.

Figure 5:
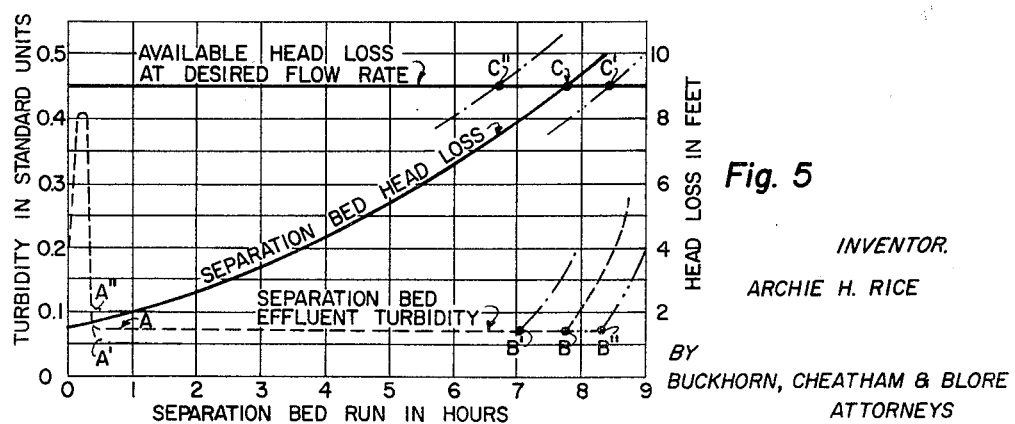
FIG. 5 is a graph illustrating certain operating characteristics of a system incorporating my invention.

The amount of the required coagulant and polyelectrolyte dosage is determined by monitoring the turbidity of the separation bed effluent and determining the amount of head loss through the bed. FIGURE 5 shows the typical operating characteristics of the process. Point A on the separation bed effluent turbidity curve represents a minimum turbidity reached during an operating cycle between back-flushings. The amount of this turbidity for a given sewage or industrial waste, separation bed and plant flow diagram is dependent primarily upon the coagulant dosage. An increase in coagulant dosage will lower the effluent turbidity toward some point A' and a decrease in coagulant dosage will increase the effluent turbidity toward point A''. For each flow diagram, separation bed and sewage or waste, there is a turbidity value above which the control becomes unstable. Point B represents a point at which a turbidity breakthrough occurs. This point is controlled by the polyelectrolyte dosage. At a given flow rate, an increase in polyelectrolyte dosage will move B toward B''. A decrease in polyelectrolyte dosage will move B toward B'. Point C represents the point where the actual head loss through the separation bed equals the available or maximum desirable head loss through the separation bed. A decrease in polyelectrolyte dosage will move C toward C' and an increase will move C toward C''.

In actual operation, a desired separation bed effluent turbidity is selected and the coagulant dosage is adjusted to produce the selected turbidity. The amount of polyelectrolyte added to the separation bed is adjusted so that points B and C are reached at the same time. When this condition is achieved, the separation bed is operating at maximum efficiency.

The separation bed, because of the relatively fine particulate nature of its media, can remove some suspended particulate matter from the sewage or industrial waste without the use of a coagulant and polyelectrolyte. If, under certain conditions, such removal is sufficient to produce an effluent satisfactory for the use or disposal method required or available, then a coagulant is not required. This condition can occur at a sewage treatment plant discharging its effluent to a river having variable flow characteristics. When the flow in the river is low, the required degree of treatment will be high and a coagulant will be required. When the flow in the river is high, the degree of treatment required will be low and a coagulant may not be required. It is impossible to generalize upon the degree of treatment which can be obtained from a separation bed without the use of a coagulant. This is entirely a function of the industrial waste or sewage being treated and can only be determined by tests on the particular waste considered.

The separation bed of the invention is advantageous even when coagulation is not performed because the arrangement of particles permits storage of relatively large amounts of removed solids permitting relatively long runs between cleaning of the filter beds.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. The method of treating sewage and liquid industrial wastes containing in excess of 50 p.p.m. BOD and in excess of 100 p.p.m. total solids which comprises passing said wastes through a primary settling tank, withdrawing the sludge from said tank and passing the same to disposal, withdrawing the effluent from said tank and adding an inorganic flocculant thereto and thereafter passing said wastes through a filter bed grading from coarse to fine particles in the direction of flow, the particles having a maximum size of 10 mm. and a minimum size of 0.35 mm.

2. The method of treating sewage and industrial wastes containing in excess of 50 p.p.m. BOD and in excess of 100 p.p.m. total solids which comprises adding an inorganic flocculant thereto and thereafter adding an organic polymer having recurring ionizable groups and substantially immediately thereafter passing said wastes through a filter bed grading from coarse to fine particles in the direction of flow, the particles having a maximum size of about 10 mm.

3. The method of claim 2 wherein said inorganic flocculant is selected from the class consisting of aluminum sulphate, copper sulphate, ferric chloride, ferric sulphate and ferrous sulphate.

4. The method of treating sewage and liquid industrial wastes containing in excess of 50 p.p.m. BOD and in excess of 100 p.p.m. total solids which comprises adding to such wastes between 5 and 300 p.p.m. of an inorganic flocculant selected from the class consisting of aluminum sulphate, copper sulphate, ferric chloride, ferric sulphate and ferrous sulphate, thereafter adding an organic polymer having recurring ionizable groups to said wastes and within five minutes passing said wastes through a separation bed comprising particles grading from coarse to fine in the direction of flow therethrough, the particles having a maximum size of about 10 mm.

5. The method of treating sewage and liquid industrial wastes containing in excess of 50 p.p.m. BOD and in excess of 100 p.p.m. total solids which comprises adding to such wastes between 5 and 300 p.p.m. of an inorganic flocculant and no more than about 2.0 p.p.m. of an organic polymer having recurring ionizable groups and within 5 minutes passing said wastes through a separation bed comprising particles grading from coarse to fine in the direction of flow therethrough, the particles having a maximum size of about 10 mm.

6. The method of treating a domestic sewage containing more than about 50 p.p.m. BOD which comprises adjusting the pH of said sewage to about 6.0, adding about 75 p.p.m. of aluminum sulfate to said sewage, adding about 1.5 p.p.m. polyacrylamide to said sewage, substantially immediately thereafter passing said sewage downwardly through a filter bed comprising about a lower six inch layer of quartz sand between 30 and 40 mesh, and an upper eighteen inch layer of anthracite coal between 16 and 20 mesh.

7. The method of purifying sewage and industrial waste which comprises adding an amount in excess of 2.0 p.p.m. of a polyelectrolyte to the same, passing said waste through a filter bed grading from coarse to fine particles in the direction of flow at a flow rate of 2.0 gallons per minute per square foot adding to said waste prior to passing through said filter bed just a sufficient amount of an inorganic flocculant to obtain a clear effluent, and decreasing the amount of polyelectrolyte until turbidity appears in the effluent, thereafter increasing tthe amount of polyelectrolyte added to said wastes until a clear filter effluent is obtained and continuing the filtration of said wastes adding thereto the flocculant and polyelectrolyte at the rates so determined.

References Cited by the Examiner
UNITED STATES PATENTS

| | | | |
|---|---|---|---|
| 212,023 | 2/79 | Maeurer | 210—252 |
| 293,745 | 2/84 | Hyatt | 210—290 |
| 962,606 | 6/10 | Wiest | 210—258 |
| 2,995,512 | 8/61 | Weidner et al. | 210—54 |

FOREIGN PATENTS 589,543  12/59  Canada.

OTHER REFERENCES

Conley, W.R.: Experience With Anthracite-Sand Filters. Journal of American Water Works Association, 53(12), pp. 1473–1478, December 1961. Apparent published date of subject matter is June 5, 1961.

Conley and Pitman: A program for filter evaluation at Hanford, J. American Water Works Association, 52(2), pp. 205–218, February 1960.

Conley and Pitman: Innovations in Water Clarification, J. Am. Water Works Assoc., 52(10), pp. 1319–1325, Oct. 1, 1960.

Emergency Use of Reclaimed Water for Potable Supply at Chanute, Kans., Metzler et al., Jour. AWWA, August 1958, vol. 50, pp. 1021–1060.

Discussion—Camp, Jour. AWWA, December 1961, vol. 53, pp. 1478–1483.

Imhoff: Sewage Treatment, 1940, John Wiley & Sons, New York, p. 88 relied on.

"The Purification of Sewage and Water," Dibdin, 3rd edition, 1903, D. Van Nostrand Co., New York, pp. 149–190.

Separan 2610 in Water Treatment, brochure by Dow Chemical Co., Midland, Mich., October 1956, pp. 8–11.

MORRIS O. WOLK, *Primary Examiner.*

ALEXANDER WYMAN, *Examiner.*